United States Patent [19]

Greulich

[11] Patent Number: 5,649,987
[45] Date of Patent: Jul. 22, 1997

[54] PROCESS FOR PRODUCING TABULAR BUILDING AND DECORATIVE MATERIALS SIMILAR TO NATURAL STONE

[75] Inventor: Norbert Greulich, Mainz, Germany

[73] Assignee: Schott Glaswerke, Mainz, Germany

[21] Appl. No.: 433,930

[22] Filed: May 2, 1995

[30] Foreign Application Priority Data

May 10, 1994 [DE] Germany .................. 44 16 489.0

[51] Int. Cl.⁶ .................. C03B 19/09; C03B 31/00
[52] U.S. Cl. .................. 65/17.5; 65/17.3; 65/65; 65/DIG. 3; 501/69; 501/155
[58] Field of Search .................. 65/17.3, 17.4, 65/17.5, 17.6, 24, 26, 65, 144, DIG. 3; 501/155, 69

[56] References Cited

U.S. PATENT DOCUMENTS

| | | | |
|---|---|---|---|
| 1,273,547 | 7/1918 | Sharples | 501/155 X |
| 1,341,979 | 6/1920 | Gronroos | 65/17.3 |
| 1,580,906 | 4/1926 | Korber et al. | 501/155 |
| 2,466,849 | 4/1949 | Hood | 65/17.3 |
| 3,900,303 | 8/1975 | Mackenzie | 65/17.5 |
| 3,941,604 | 3/1976 | Boyce | 501/155 X |
| 4,451,294 | 5/1984 | Popov et al. | 106/75 |
| 5,244,850 | 9/1993 | Dutton | 501/128 |
| 5,286,269 | 2/1994 | Paschke et al. | 65/17.3 |

FOREIGN PATENT DOCUMENTS

| | | | |
|---|---|---|---|
| 2814315 | 12/1979 | Germany | C04B 14/22 |
| 1165814 | 3/1984 | Germany . | |
| 256052 | 4/1988 | Germany | C04B 14/22 |
| 4123581 | 1/1993 | Germany . | |
| 4319808 | 7/1994 | Germany . | |
| 46-42115 | 12/1971 | Japan . | |
| 48-5241 | 2/1973 | Japan . | |
| 60-16830 | 1/1985 | Japan . | |
| 63-69726 | 3/1988 | Japan . | |
| 729148 | 4/1980 | U.S.S.R. . | |
| 925883 | 5/1982 | U.S.S.R. . | |
| 1505901 | 9/1989 | U.S.S.R. . | |
| 1828453 | 7/1993 | U.S.S.R. . | |
| 16696 | 10/1890 | United Kingdom . | |

OTHER PUBLICATIONS

Abstract, CN1084120, J. Liu, "Artifical Granite Decoration Plate", 23 May 1994.
Abstract, CN8704465, Chongqing Architect, "Prodn. of Granite . . . ", 25 May 1988.
Abstract, SU1505901, UKR Town Planning, "Artificial Stone with . . . " 7 Sep. 1989.
W. Liu, et al. "Sintered mosaic glass from ground waste glass," Glass Technology, Feb. 1991, pp. 24–27.

*Primary Examiner*—Donald E. Czaja
*Assistant Examiner*—Sean Vincent
*Attorney, Agent, or Firm*—Michael D. Bednarek; Kilpatrick Stockton LLP

[57] ABSTRACT

A process for producing tabular building and decorative materials similar to natural stone and having high strength for the facing of facades, walls and floors in interior and exterior applications from thermally treated mixtures of crushed glass, ceramic components and finely divided additives and materials produced by the process.

18 Claims, No Drawings

PROCESS FOR PRODUCING TABULAR BUILDING AND DECORATIVE MATERIALS SIMILAR TO NATURAL STONE

The invention relates to a process for producing tabular building and decorative materials similar to natural stone and having high strength for the facing of facades, walls and floors in interior and exterior applications from mixtures of crushed glass, mineral components and finely divided additives and materials produced by the process.

For interior and exterior decorative applications, numerous natural and synthetically produced materials are being used. Widely used among the natural materials are, in particular, marble and granite which are used in large amounts for the interior and exterior facing of prestigious buildings. Apart from the decorative appearance, it is also necessary to ensure the corrosion resistance and economical production. Naturally occurring materials do not always meet these requirements, since sufficiently large areas having a uniform appearance can frequently not be produced and since the corrosion resistance and the strength is not always optimal owing to the porosity of the natural material.

Thus, DE 41 25 698 C1 discloses a glass ceramic material having a composition (in % by weight based on oxide) of

|       |          |
|-------|----------|
| $SiO_2$ | 64.1–72 |
| $Al_2O_3$ | 2.9–11 |
| CaO   | 15.0–26  |
| MgO   | 0–8      |
| ZnO   | $0 \leq 2$ |
| BaO   | 0–0.5    |
| $K_2O$  | 0–7.4   |
| $Na_2O$ | 0–2    |
| F     | 0.5–4    | where $\Sigma\ Na_2O, K_2O$ is at least 2, which is used as a natural stone substitute for decorative applications and for covering floors and facing walls and facades in the building industry.

Although glass ceramic as a natural stone substitute offers a good decorative appearance, it is, for example, also complicated and expensive to produce because of its complicated ceramicizing process. Furthermore, relatively pure and thus valuable raw materials are necessary for its production.

DE 41 23 581 A1 discloses a process for producing shaped bodies of glass granules, in particular building slabs, in which raw granules are produced from a mixture of comminuted glass and a blowing agent and these raw granules can be expanded under the action of heat, where first a layer of unexpanded raw granules and, over this, a layer of expanded foamed glass granules in the still hot or alternatively cold state are poured into a mould as a loose bed and the loose bed is heated to from 700° to 900° C., preferably 800°–900° C.

and is then compacted by 5–15% under a pressure of 0.005–0.015 N/mm², giving a strongly bonded shaped body.

These building slabs produced by the process of DE 41 23 581 A1 are particularly suitable as insulation slabs in a composite heat insulation system, with the raw granules making up the slabs having to be energy-intensively produced beforehand.

It is an object of the present invention to provide a process for producing high-strength, tabular building materials, also in large formats, which are decorative, similar to natural stone, weather-resistant and resistant to acid and alkaline media, and which make it possible, inexpensively and in an environmentally friendly way without organic additives using cheap and readily available raw materials such as glass, used glass and natural inorganic aggregates, to produce facing slabs for facades, walls and floors, which meet all the conditions of building and official regulations and additionally satisfy the demands for an aesthetic, contemporary design with variable constructional possibilities.

It is a further object of the invention to select the production parameters in such a way that the proposed procedure and suitable temperatures in the production of the building materials give slabs which do not react with the production mould have no unevennesses on the slab surface do not deform, have no bubbles, pores, inclusions and/or microcracks forming in the outer layer, do not require grinding or polishing, and have high flexural strengths.

This object is achieved according to the invention by the process steps discussed hereinafter.

After the preparation of the mixtures levelled out in the temperature-resistant moulds, the thermal treatment commences with drying in the mould, at temperatures from 60° to 110° C. This is followed by:

Heating the mixture to a temperature of 720°–1100° C. The respective temperature depends on the chemical composition of the batch and the type of granulated glass. The heating time is a maximum of about 36 hours at a heating rate of 0.5K/min to 1100° C. and a minimum of about 3.8 hours at a heating rate of 3K/min to 720° C.

In a preferred embodiment of the process, heating below the glass transition temperature can be carried out at up to 12K/min, which correspondingly reduces the specified periods of time.

The levelled-out mixtures are held at this temperature, i.e. 720°–1100° C. The hold time is from 20 to 120 minutes, depending on the slab thickness. Typically, a layer having an initial thickness of 45 mm is ignited for 60 min. The temperature differences at the slab surface should not be greater than ±10K. At greater temperature differences, the slab edges become uneven, the thickness of the remelted layer at the edges becomes nonuniform, so that part of the edge would have to be cut off for quality reasons. This step is important with regard to the production of a high-quality surface layer. The temperature of this process step has to be held for a time which makes it possible for a stationary thermal state to be reached. If the hold time is reduced, the slab surface becomes increasingly dull and rough.

Heat is applied uniformly from all sides, in an industrial-scale version preferably in a tunnel kiln having continuous or stepwise operation.

The determination of the maximum process temperature for batches of differing compositions is particularly important. If the temperature selected is too high, the viscosity becomes too low and flaws are formed on the surface of the slab owing to excess degassing of the underlying material layers. If the temperature selected is too low, the optimum mechanical properties are not achieved. The same adverse effect is obtained if the maximum process temperature acts for too short a time. The temperature differences on the surface must not exceed ±10K. The maximum temperature is dependent on the chemical composition of the batch and its particle size distribution and is, for example, typically from 720° to 1100° C.

Cooling to room temperature is carried out over the period of time necessary for a uniform temperature distribution over the entire thickness of the slab to be achieved, over a period of time of at most 36 hours at an initial temperature of 1100° C. and a cooling rate of 0.5K/min and at least 3 hours for a temperature of 720° C. and a cooling rate of 3K/min, and taking the slab from the furnace at 200° C.

In a preferred process variant, the cooling can also be carried out in two substeps, namely at 0.5–3.0K/min to 700°–400° C. and at 3–12K/min to room temperature. This further speeds up the process.

The slabs of the invention can be produced without problems either in a batch furnace having programmed heating and cooling rates, or in a tunnel kiln having an appropriate temperature distribution.

Slabs were also taken directly from the furnace at temperatures of 200° C.

In a preferred embodiment, it is possible, according to the invention, for a hold time of from 30 to 60 minutes to be provided during the heating phase between 400° C. and 600° C. and a hold time of from 20 to 60 minutes to be provided between 400° C. and 600° C. during the heating phase and a hold time of from 20 to 60 minutes to be provided between 600° C. and 400° C. during the cooling phase.

This has the advantage that in each case a stationary thermal state is reached in the slab.

According to the invention, the crushed glass used can be a granulated glass from recycled television glass, sheet glass and/or hollow glass such as, for example, from bottles and containers, and mixtures thereof.

Owing to the expected obligations to take back used electrical appliances, very large quantities of used picture tubes and glass from baking ovens will arise in the medium term. This glass which has been taken back can, according to the invention, be recycled to high-value for further use.

The glasses used should have a composition within the limits (in % by mass)

| | | | |
|---|---|---|---|
| $SiO_2$ | 55–82 | in particular | 55–65 |
| $Al_2O_3$ | 1–4 | in particular | 1–4 |
| $Na_2O$ | 2–16 | in particular | 6–10 |
| $K_2O$ | 0–10 | in particular | 6–10 |
| MgO | 0–5 | in particular | 0–3 |
| CaO | 0–12 | in particular | 0–5 |
| PbO | 0–3 | in particular | 0–3 |
| BaO | 0–15 | in particular | 1–15 |
| $B_2O_3$ | 0–15 | in particular | 0 |
| SrO | 0–11 | in particular | 0–11 |
| ZnO | 0–1 | in particular | 0–1 |
| $ZrO_2$ | 0–3 | in particular | 0–3 |
| $TiO_2$ | 0–1 | in particular | 0–1 |
| $CeO_2$ | 0–1 | in particular | 0–1 |
| $Sb_2O_3$ | 0–1 | in particular | 0–1 |
| $As_2O_3$ | 0–1 | in particular | 0–1 |
| F | 0–1 | in particular | 0–1 | and be used in a grain size of 0.2–3 mm and with a moisture content of 1–3%.

The granulated glass should preferably have a grain size of from 0.3 to 1 mm. It has been found experimentally that in the case of a larger or smaller grain size, it is possible for the mechanical properties of the slab to be impaired. If the grain size is too small, internal hollow spaces and pores are formed. The moisture content of the granulated glass prior to the mixing with sand should be not less than 2%.

If dry starting materials are used, water has to be added to introduce the starting mixture homogeneously into the mould and to prevent segregation by settling and trickling through of the fine and very fine additives from the upper region of the mixture into the lower regions.

In a preferred embodiment, the mineral components used are, in particular, natural or synthetic calcareous sandstone, quartz sand, granite, ground brick, clinker and/or ceramic materials, such as broken porcelain, but also mica and/or fibres in grain sizes or in lengths of <3 mm, preferably <0.4 mm and in mounts of at most 14.7% by mass.

In place of the calcareous sandstone, it is also possible to use mixtures of quartz sand and, in particular, quicklime to improve the reproducibility of the addition of these mineral components.

Finely divided additives used according to the invention are 0.3–5% by mass of one or more high-temperature-resistant oxides, in particular $ZrO_2$ and/or $TiO_2$ and/or SnO and/or MgO and/or CaO and/or a mixed oxide such as kaolin and/or $ZrSiO_4$. The particle sizes of these finely divided additives are <60 µm, in particular <20 µm.

The nucleating action of finely divided $TiO_2$, $ZrO_2$ and other oxides is known in the production of glass ceramics by means of targeted crystallization from the melt. Furthermore, $ZrO_2$ in particular is used for the dispersion reinforcement of sintered products made of glass ceramic. All the specified oxides can also be used as thermally stable white pigments.

These abovementioned mechanisms possibly also play a role in explaining the excellent physical and chemical properties of the materials of the invention.

Further finely divided additives which can be added are inorganic pigments and/or metal oxides and/or glass powders and/or slags in particle sizes <60 µm, in particular <20 µm, in amounts of 0–5.0% by mass.

Glass fibres in the abovementioned amounts and within the abovementioned dimension limits can also be mixed in.

In addition, finely divided metal particles, such as iron, copper, nickel, chromium, steel and/or their salts, can be applied to the surface of the layer.

The mixtures of the invention are produced from 85–98% by mass of crushed glass, 0–14.7% by mass of a mineral component and a total of 0.3–5% by mass of finely divided additives, but with the surface of the layer of the mixture also being able to be made, in a thickness of 3–7 mm, of 100% by mass of crushed glass.

The process for producing the decorative building materials of the invention which are similar to natural stone is illustrated by way of the following examples:

Example 1

95% by mass of recycled television screen glass of the composition (in % by mass): $SiO_2$ 60.1; $Al_2O_3$ 2.1; $Na_2O$ 9.0; $K_2O$ 7.0; MgO 1.9; CaO 2.6; BaO 13.1; SrO 0.3; ZnO 0.5; $ZrO_2$ 2.1; $TiO_2$ 0.5; $CeO_2$ 0.2; $Sb_2O_3$ 0.6 and a grain size of 0.3–1.0 mm, 3.8% by mass of calcareous sandstone having a grain size <0.4 mm, 0.1% by mass of pigment (grade H 54122 ultramarine, from Heraeus) are first mixed in the dry state with 1.0% by mass of zirconium oxide having a grain size <0.02 mm in a tumble mixer. After 10 minutes, 2% by mass of water are added and mixing is continued for 15 minutes. The moist mixture is introduced into a refractory mould 45 mm deep and levelled.

The inner surface of the mould was coated beforehand with a release agent (e.g. a kaolin suspension).

The mould comprises conventional fire-resistant or refractory material. Advantageous materials are, for example, cordierire and SiC as are also used as kiln furniture throughout the ceramic industry.

The mould material must here be selected in such a way that sintering ("baking together") of the mould with the mixture does not occur at the process temperatures.

After a drying time of about 10 hours at 60° C., the filled mould is heat treated in a batch furnace using the following temperature/time programme: heating rate 0.5K/min up to 650° C., then 1 hour hold time, heating rate 0.5K/min up to 1000° C., then 1 hour hold time, cooling to room temperature at 0.5K/min.

The result is a steel blue slab having a closed, glossy surface and a flexural strength between 21 and 22 N/mm². The finished slab has a uniform material thickness of 23 mm.

Example 2

85% by mass of recycled television screen glass of the composition (in % by mass): $SiO_2$ 61.5; $Al_2O_3$ 3.1; $Na_2O$ 9.3; $K_2O$ 7.0; MgO 1.7; CaO 2.4; BaO 12.5; SrO 1.2; ZrO 0.2; $TiO_2$ 0.4; $CeO_2$ 0.2; $Sb_2O_3$ 0.5 and a grain size of 0.3–1.0 mm, 12.0% by mass of recycled green bottle glass having a grain size of <0.4 mm and 2.0% by mass of calcareous sandstone having a grain size of <0.4 mm, are first mixed in the dry state with 1.0% by mass of zirconium oxide having a grain size of <0.02 mm in a tumble mixer. After 10 minutes, 2% by mass of water are added and mixing is continued for 15 minutes. The moist mixture is introduced into a refractory mould 33 mm deep. The inner surface of the mould was again coated beforehand with a release agent (e.g. a kaolin suspension).

After a drying time of 10 hours at 60° C., the filled mould is heat treated in a sintering furnace using the following temperature/time programme: heating rate 0.5K/min to 650° C., 1 hour hold time there, heating rate 0.5K/min to 1000° C., 1 hour hold time there, cooling to room temperature at 0.5K/min.

This gives a pale green slab having a closed, glossy surface and a flexural strength between 19 and 23 N/mm². The finished slab has a uniform material thickness of 16 mm.

Example 3

94% by mass of recycled television screen glass having the composition as in Example 1 and a grain size of 0.4–1.0 mm, 5.0% by mass of calcareous sandstone having a grain size of <0.4 mm, 0.1% by mass of pigment (grade H 26140 red-brown, from Schott Glaswerke) are first mixed in the dry state with 1.0% by mass of zirconium oxide having a grain size of <0.02 mm in a tumble mixer. After 10 minutes, 2% by mass of water are added and mixing is continued for 15 minutes. The moist mixture is introduced into a refractory mould 20 mm deep.

A 5 mm thick layer of pure recycled television screen glass having a grain size 0.5–1.0 mm is uniformly sprinkled over this bed.

The inside of the mould was again coated beforehand with a kaolin suspension.

After a drying time of 10 hours at 60° C., the filled mould is heat treated in a sintering furnace using the following temperature/time programme: heating rate 2.0K/min to 650° C., 0.5 hour hold time there, heating rate 2.0K/min to 850° C., 2 hours hold time there, cooling to 500° C. at 1.0K/min, 0.5 hour hold time there, cooling to room temperature at 3.0K/min.

The result is a violet slab having a closed, glossy surface and a flexural strength between 18 and 20 N/mm². The finished slab has a uniform material thickness of 12 mm.

Example 4

90% by mass of recycled television screen glass having the composition as in Example 2 and a grain size of 0.4–1.0 mm, 9.0% by mass of calcareous sandstone having a grain size of <0.4 mm, are first mixed in the dry state with 1.0% by mass of zirconium oxide having a grain size of <0.02 mm in a tumble mixer. After 10 min, 2% by mass of water are added and mixing is continued for 15 minutes. The moist mixture is introduced into a refractory mould 20 mm deep. The inner surface of the mould was again coated beforehand with a release agent (e.g. a kaolin suspension).

After a drying time of 10 hours at 60° C., the filled mould is heat treated in a sintering furnace using the following temperature/time programme: heating rate 3.0K/min to 1000° C., 20 minutes hold time there, cooling to 200° C. at 2.0K/min, taking the slab from the furnace.

This gives a pale grey slab having a closed, glossy surface and a flexural strength between 15 and 18 N/mm². The finished slab has a uniform material thickness of 10 mm.

This slab can subsequently also be dropped at 650°–800° C. using the measures known to those skilled in the art and, for example, bent down to radii of curvature of 150 mm, for example to match it to certain facade structures. In the present example, the slab was heated to 720° C. for bending.

The examples give very durable building and decorative materials which are similar to natural stone and have a long lifetime. They are used for facing exterior and interior walls of constructions in the industrial, residential and traffic sectors, for furniture, work surfaces in kitchens and laboratories and for decorative works of art. It has high strength and hardness. It is hygienic, easy to clean, resistant to high temperatures, chemically resistant, electrically non-conductive and non-flammable.

With regard to the physical, chemical and mechanical properties, the building and decorative material presented is better than natural, expensive materials such as, for example, granite, marble or travertine.

The geometric limits of the invention are around slab sizes of 2000 mm in length and 1000 mm in width, with a minimum slab thickness of 6 mm and a maximum slab thickness of 40 mm.

The slabs of the invention are fastened, for example, via a holder arrangement as is presented in EP 04 11 442 B1 or via the arrangements which are at present conventional and known on the market.

The advantages of the building and decorative materials of the present invention are:

1. The flexural strength is at least 14–18 MPa, if $ZrO_2$ is used 19–23 MPa.

2. No microcracks on the surface, so that the stain resistance in accordance with DIN EN 122 is class 1.

3. The appearance of different slabs is more uniform and thus more reproducible than of slabs which are made without the additives of the invention, which latter slabs frequently have a completely different appearance despite unchanged manufacturing parameters.

4. The visual impact of the slab surface is far livelier and strongly resembles certain natural types of stone, e.g. granite.

5. The material surfaces can be given any desired colour and structure.

6. An individual, tasteful appearance is reproducible.

7. The material has very few bubbles in the interior (if the surface is polished, bubbles show up and spoil the appearance).

8. The use of recycled glasses conserves the stocks of natural stone and thus makes the process of the invention ecologically interesting too.

I claim:

1. A process for producing tabular building and decorative materials similar to natural stone and having high strength for the facing of facades, walls and floors in interior and exterior applications from mixtures of crushed glass, mineral components and finely divided additives, comprising the process steps of:

providing a mixture including 85–98% by mass of crushed glass, 0–14.7% by mass of a mineral component in grain sizes <3 mm and a total of 0.3–5% by mass of finely divided additives in particle sizes <60 µm;

introducing a level, uniformly thick layer of the mixture into a temperature-resistant mould;

drying the layer in the mould at at a temperature of 60° to 110° C.;

heating the layer at 0.5–3.0K/min up to a temperature of 720°–1100° C. and holding the layer at this temperature for 20–120 min;

cooling the layer at 0.5–3.0K/min down to room temperature.

2. The process according to claim 1, wherein the crushed glass used is a granulated glass having the composition (in % by mass):

| | |
|---|---|
| $SiO_2$ | 55–82 |
| $Al_2O_3$ | 1–4 |
| $Na_2O$ | 2–16 |
| $K_2O$ | 0–10 |
| $MgO$ | 0–5 |
| $CaO$ | 0–12 |
| $PbO$ | 0–3 |
| $BaO$ | 0–15 |
| $B_2O_3$ | 0–15 |
| $SrO$ | 0–11 |
| $ZnO$ | 0–1 |
| $ZrO_2$ | 0–3 |
| $TiO_2$ | 0–1 |
| $CeO_2$ | 0–1 |
| $Sb_2O_3$ | 0–1 |
| $As_2O_3$ | 0–1 |
| F | 0–1 | and a grain size from 0.2 to 3 mm, and a moisture content of 1–3% by mass, of water.

3. The process according to claim 2, wherein the glass used is a granulated glass of recycled picture tube glass.

4. The process according to claim 1, wherein the mineral components used are 0–14.7% by mass of one or more from a group consisting of calcareous sandstone, quartz sand, ceramic materials and clinker, in grain sizes <0.4 mm.

5. The process according to claim 1, wherein the finely divided additives which are added are 0.3–5% by mass of one or more from the group consisting of high-temperature-resistant oxides, and a mixed oxide, in particle sizes <20 µm.

6. The process according to claim 1, wherein the mixture further includes secondary finely divided additives having particle sizes <60 µm, in amounts of 0–5% by mass.

7. The process according to claim 1, wherein the surface of the layer is, in a thickness of 3–7 mm, made of 100% by mass of crushed glass.

8. The process according to claim 1, wherein finely divided metal particles, are applied to the surface of the layer.

9. The process according to claim 1, wherein the crushed glass used is a granulated glass having the composition (in % by mass):

| | |
|---|---|
| $SiO_2$ | 55–82 |
| $Al_2O_3$ | 1–4 |
| $Na_2O$ | 2–16 |
| $K_2O$ | 0–10 |
| $MgO$ | 0–5 |
| $CaO$ | 0–12 |
| $PbO$ | 0–3 |
| $BaO$ | 0–15 |
| $B_2O_3$ | 0–15 |
| $SrO$ | 0–11 |
| $ZnO$ | 0–1 |
| $ZrO_2$ | 0–3 |
| $TiO_2$ | 0–1 |
| $CeO_2$ | 0–1 |
| $Sb_2O_3$ | 0–1 |
| $As_2O_3$ | 0–1 |
| F | 0–1 | and a grain size of from 0.3 to 1 mm and a moisture content of 1–3% by mass, of water.

10. The process according to claim 1, wherein the crushed glass used is a granulated glass having the composition (in % by mass):

| | |
|---|---|
| $SiO_2$ | 55–82 |
| $Al_2O_3$ | 1–4 |
| $Na_2O$ | 2–16 |
| $K_2O$ | 0–10 |
| $MgO$ | 0–5 |
| $CaO$ | 0–12 |
| $PbO$ | 0–3 |
| $BaO$ | 0–15 |
| $B_2O_3$ | 0–15 |
| $SrO$ | 0–11 |
| $ZnO$ | 0–1 |
| $ZrO_2$ | 0–3 |
| $TiO_2$ | 0–1 |
| $CeO_2$ | 0–1 |
| $Sb_2O_3$ | 0–1 |
| $As_2O_3$ | 0–1 |
| F | 0–1 | and a grain size of from 0.2 to 3 mm and a moisture content of 2% by mass, of water.

11. The process according to claim 1, wherein the crushed glass used is a granulated glass having the composition (in % by mass):

| | |
|---|---|
| $SiO_2$ | 55–82 |
| $Al_2O_3$ | 1–4 |
| $Na_2O$ | 2–16 |
| $K_2O$ | 0–10 |
| $MgO$ | 0–5 |
| $CaO$ | 0–12 |
| $PbO$ | 0–3 |
| $BaO$ | 0–15 |
| $B_2O_3$ | 0–15 |
| $SrO$ | 0–11 |
| $ZnO$ | 0–1 |
| $ZrO_2$ | 0–3 |
| $TiO_2$ | 0–1 |
| $CeO_2$ | 0–1 |
| $Sb_2O_3$ | 0–1 |
| $As_2O_3$ | 0–1 |
| F | 0–1 | and a grain size of from 0.3 to 1 mm and a moisture content of 2% by mass, of water.

12. The process according to claim 2, wherein the glass used is a granulated glass of recycled picture tube glass, of the composition (in % by mass):

| | |
|---|---|
| $SiO_2$ | 55–65 |
| $Al_2O_3$ | 1–4 |
| $Na_2O$ | 6–10 |
| $K_2O$ | 6–10 |
| $MgO$ | 0–3 |
| $CaO$ | 0–5 |
| $PbO$ | 0–3 |
| $BaO$ | 1–15 |
| $SrO$ | 0–11 |
| $ZnO$ | 0–1 |
| $ZrO_2$ | 0–3 |
| $TiO_2$ | 0–1 |
| $CeO_2$ | 0–1 |
| $Sb_2O_3$ | 0–1 |
| $As_2O_3$ | 0–1 |
| F | 0–1. |

13. The process according to claim 1, wherein the finely divided additives which are added are 0.3–5% by mass of one or more from the group consisting of $ZrO_2$, MgO, SnO, CaO and $TiO_2$, kaolin and $ZrSiO_4$, in particle sizes <60 μm.

14. The process according to claim 1, wherein the finely divided additives which are added are 0.3–5% by mass of one or more from the group consisting of $ZrO_2$, MgO, SnO, CaO and $TiO_2$, kaolin and $ZrSiO_4$, in particle sizes <20 μm.

15. The process according to claim 1, wherein additions are made of one or more from the group consisting of inorganic pigments, metal oxides, glasses and coloured glasses, having particle sizes <60 μm, in amounts of 0–5% by mass.

16. The process according to claim 1, wherein additions are made of one or more from the group consisting of inorganic pigments, metal oxides, glasses and coloured glasses, having particle sizes <20 μm, in amounts of 0–5% by mass.

17. The process according to claim 1, wherein the surface of the layer has a thickness of 4–6 mm, which is made of 100% by mass of crushed glass.

18. The process according to claim 1, wherein finely divided metal particles comprised of one or more from the group consisting of iron, copper, nickel, chromium, steel, and salts thereof, are applied to the surface of the layer.

* * * * *